United States Patent
Landers

(10) Patent No.: US 9,648,846 B2
(45) Date of Patent: May 16, 2017

(54) DURABLE PET BED

(71) Applicant: Joseph Thomas Landers, Scottsdale, AZ (US)

(72) Inventor: Joseph Thomas Landers, Scottsdale, AZ (US)

(*) Notice: Subject to any disclaimer, the term of this patent is extended or adjusted under 35 U.S.C. 154(b) by 0 days.

(21) Appl. No.: 13/836,990

(22) Filed: Mar. 15, 2013

(65) Prior Publication Data

US 2014/0261190 A1    Sep. 18, 2014

(51) Int. Cl.
| | | |
|---|---|---|
| A01K 1/035 | (2006.01) | |
| B29C 63/00 | (2006.01) | |
| B29L 31/00 | (2006.01) | |
| B29C 63/02 | (2006.01) | |

(52) U.S. Cl.
CPC ........ *A01K 1/0353* (2013.01); *B29C 63/0026* (2013.01); *B29C 63/02* (2013.01); *B29L 2031/751* (2013.01); *Y10T 156/10* (2015.01)

(58) Field of Classification Search
CPC .... A01K 1/0353; A01K 1/035; A01K 1/0157; A01K 1/033; A01K 29/00; A01K 1/0272; A47D 7/00; A47D 9/00; B32B 37/14; B32B 37/16; B32B 37/144; A47C 27/005; A47C 27/008; A47C 27/14; A47C 27/05; A47C 27/15
USPC ........... 119/28.5, 169, 170, 171; 5/484, 502, 5/699, 740, 690
See application file for complete search history.

(56) References Cited

U.S. PATENT DOCUMENTS

| | | |
|---|---|---|
| 5,002,014 A | 3/1991 | Albin |
| 5,072,694 A | 12/1991 | Haynes et al. |
| 5,119,763 A | 6/1992 | Crabtree |
| 5,197,411 A | 3/1993 | Schwarzenbart |
| 5,226,384 A | 7/1993 | Jordan |
| D338,284 S | 8/1993 | Barreto, III et al. |
| 5,265,558 A | 11/1993 | Schonrock |
| D346,246 S | 4/1994 | Barreto et al. |
| D349,787 S | 8/1994 | McMahon |

(Continued)

FOREIGN PATENT DOCUMENTS

| | | |
|---|---|---|
| WO | WO03079771 A1 | 10/2003 |
| WO | WO2004100652 A3 | 11/2004 |

(Continued)

OTHER PUBLICATIONS http://www.petobed.com/ (1 page—printed Oct. 18, 2013).

(Continued)

*Primary Examiner* — Trinh Nguyen

(74) *Attorney, Agent, or Firm* — Hasse & Nesbitt LLC; Donald E. Hasse

(57) ABSTRACT

A durable pet having a flat polyurethane foam core, a first polyurethane layer bonded to the top surface of the core, and a second polyurethane layer bonded to the sides of the core, and a method for making such a bed. The first polyurethane layer has a thickness of about 0.05 to 0.25 inches and a hardness of about 20 to 70 durometers. The second polyurethane layer has a thickness of about 0.05 to 0.3 inches and a hardness of about 50 to 100 durometers. The pet bed may have a third polyurethane layer bonded to the bottom of the core, the third layer having a thickness of about 0.05 to 0.25 inches and a hardness of about 20 to 100 durometers. The first, second and third layers typically completely encase the core.

10 Claims, 1 Drawing Sheet

(56) References Cited

U.S. PATENT DOCUMENTS

| | | |
|---|---|---|
| D376,875 S | 12/1996 | Glickstein |
| 5,685,257 A | 11/1997 | Feibus |
| D391,687 S | 3/1998 | McMahon |
| 5,724,911 A | 3/1998 | McAlister |
| 5,765,502 A | 6/1998 | Haugh |
| 5,784,995 A | 7/1998 | Willinger |
| D414,003 S | 9/1999 | Hering |
| 6,196,156 B1 | 3/2001 | Denesuk et al. |
| 6,196,157 B1 | 3/2001 | Northrop et al. |
| 6,269,768 B1 | 8/2001 | Zartman |
| 6,286,456 B1 | 9/2001 | Michaelis |
| 6,588,366 B1 | 7/2003 | Ranson et al. |
| 6,591,778 B1 | 7/2003 | Alderman |
| D488,888 S | 4/2004 | Link |
| 6,851,385 B1 | 2/2005 | Poss et al. |
| D506,038 S | 6/2005 | Lamstein |
| 7,185,604 B2 | 3/2007 | Holte |
| D539,990 S | 4/2007 | Martin et al. |
| 7,225,756 B2 | 6/2007 | Greenfield |
| D584,012 S | 12/2008 | Abernathy |
| D591,913 S | 5/2009 | Drew |
| 7,614,362 B2 | 11/2009 | Dunn et al. |
| 7,765,952 B1 | 8/2010 | Archibald |
| 7,921,807 B2 | 4/2011 | Arvanites |
| 2003/0041808 A1* | 3/2003 | Wulforst et al. ............. 119/28.5 |
| 2006/0254526 A1 | 11/2006 | Andriola |
| 2006/0272583 A1 | 12/2006 | Brown |
| 2006/0288949 A1 | 12/2006 | Axinte et al. |
| 2007/0056096 A1 | 3/2007 | Assink |
| 2008/0127899 A1 | 6/2008 | Angus |
| 2008/0178812 A1 | 7/2008 | Dennis et al. |
| 2010/0043713 A1 | 2/2010 | West |
| 2010/0071627 A1 | 3/2010 | Beard |
| 2010/0095894 A1 | 4/2010 | Grignard |
| 2011/0197818 A1 | 8/2011 | Simon et al. |
| 2011/0239946 A1 | 10/2011 | Ogle |
| 2013/0025069 A1* | 1/2013 | Ruehlmann .......... A47C 21/046 5/740 |

FOREIGN PATENT DOCUMENTS

| | | |
|---|---|---|
| WO | WO2005089541 A1 | 9/2005 |
| WO | WO2006110808 A3 | 10/2006 |
| WO | WO2007038511 A2 | 4/2007 |
| WO | WO2007062426 A2 | 5/2007 |
| WO | WO2007079335 A2 | 7/2007 |
| WO | WO2008011568 A2 | 1/2008 |
| WO | WO2008030460 A2 | 3/2008 |
| WO | WO2009039534 A1 | 3/2009 |

OTHER PUBLICATIONS http://www.alibaba.com/showroom/dog-bed-pu.html (7 pages—copyright 1999-2013 Alilbaba.com Hong Kong).
Dog Beds, A Polyurethane foam Dog Bed Provides Lasting Comfort for use on your Pet, Apr. 24, 2011, http://dogbedss.blogspot.in/2011/04/polyurethane-foam-dog-bed-provides.html (2 pages).
http://www.alibaba.com/showroom/dog-bed.html (8 pages—copyright 1999-2013 Alilbaba.com Hong Kong).
http://www.lifeofdog.com/dog-supplies/dog-beds-for-less (5 pages—copyright 2013 Life of Dog).
http://www.petshed.com/item/comfort-pet-memory-foam-bed (2 pages—copyright 2013 Pet Shed).
http://www.petfrenzy.com/chew-proof-dog-beds.html (2 pages—copyright 2013 Pet Frenzy).

* cited by examiner

DURABLE PET BED

FIELD OF THE INVENTION

The present invention relates to beds for domestic animals, particularly to durable pet beds for dogs, including beds of orthopedic quality. The invention also relates to methods of making such beds.

BACKGROUND OF THE INVENTION

Many dogs, especially puppies, chew on their beds. Even expensive orthopedic-type beds can be destroyed by pets in a short period of time. Some people thus purchase only low cost beds that provide little support or padding for their pets and have cheap fabric covers. Such beds are easily destroyed and only offer limited support for the animal.

U.S. Pat. No. 5,265,558, Schonrock, discloses a foam bed for domestic animals. The bed is described as having a liquid-impermeable, closed pore skin that can be covered with any desired fabric.

U.S. Pat. No. 5,226,384, Jordan, discloses an animal bed having a resilient core encased by a cover formed of an aramid fabric sheet. The bed is said to be resistant to destructive activities of the animal, such as biting or clawing, impervious to water and pest infestation, and easily cleaned and portable.

U.S. Pat. No. 6,269,768, Zartman, discloses an animal mattress said to resist damage. The pad is made from a relatively loose pack of long particle recycled tire rubber bonded with a polymer, such as polyurethane. The pad has corrugations on the bottom, a flat top, and a waterproof polymer fabric cover.

While the above animal beds may be suitable for their intended uses, there is a continuing need for a pet bed that provides improved durability and comfort.

SUMMARY OF THE INVENTION

The present invention relates to a durable pet bed comprising a flat polyurethane foam core having a top surface, a bottom surface and generally vertical sides, a first polyurethane layer bonded to the top surface of the core, said first layer having a thickness of from about 0.05 to about 0.25 inches and a hardness of from about 20 to about 70 durometers as measured using the ASTM D2240 type A scale, and a second polyurethane layer bonded to the sides of the core, said second layer having a thickness of from about 0.05 to about 0.3 inches and a hardness of from about 50 to about 100 durometers as measured using the ASTM D2240 type A scale.

In one embodiment, the invention relates to a durable pet bed comprising a flat polyurethane foam core having a top surface, a bottom surface and generally vertical sides, a first polyurethane layer bonded to the top surface of the core, said first layer having a thickness of from about 0.1 to about 0.2 inches and a hardness of from about 30 to about 50 durometers as measured using the ASTM D2240 type A scale, a second polyurethane layer bonded to the sides of the core, said second layer having a thickness of from about 0.1 to about 0.25 inches and a hardness of from about 60 to about 80 durometers as measured using the ASTM D2240 type A scale, and a third polyurethane layer bonded to the bottom surface of the core, said third layer having a thickness of from about 0.1 to about 0.2 inches and having a hardness of from about 30 to about 50 durometers as measured using the ASTM D2240 type A scale, wherein said first, second and third layers completely encase the core.

The invention also relates to a method of making a durable pet bed, said method comprising (1) providing a flat polyurethane foam core having a top surface, a bottom surface and generally vertical sides, (2) bonding a first polyurethane layer to the top surface of the core, said first layer having a thickness of from about 0.05 to about 0.25 inches and a hardness of from about 20 to about 70 durometers as measured using the ASTM D2240 type A scale, and (3) bonding a second polyurethane layer to the sides of the core, said second layer having a thickness of from about 0.05 to about 0.3 inches and a hardness of from about 50 to about 100 durometers as measured using the ASTM D2240 type A scale.

DETAILED DESCRIPTION OF THE INVENTION

Figure 1:
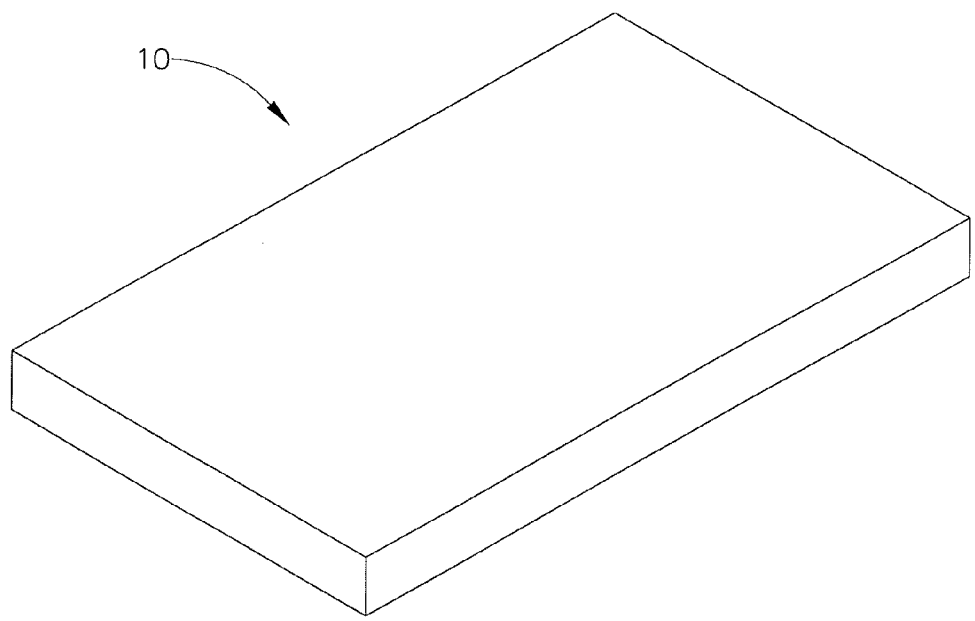
FIG. 1 is a perspective view of a pet bed according to the invention.

Referring now to the drawings, FIG. 1 is an example of a pet bed 10 according to the invention. Bed 10 has a flat polyurethane foam core 12 that has a top surface 14, a bottom surface 16, and generally vertical sides 18. The length, width, thickness and shape of the foam core 12, and the finished pet bed 10, can be varied depending on the size of the pet and owner preferences. The foam core and the bed typically have a rectangular shape with a length of about 20 to 40 inches, a width of about 12 to 25 inches, and a thickness of about 1 to 3 inches.

Various polyurethane materials are suitable for use as the foam core. The polyurethane foam can be selected to provide a combination of properties, including comfort, abrasion resistance, tensile strength, compression recovery, firmness, density, shape, and temperature range. The polyurethane may be a rigid foam or a flexible foam.

The pet bed 10 has a first polyurethane layer 20 bonded to the top surface 14 of the core. The first layer has a thickness of from about 0.05 to about 0.25 inches, typically from about 0.1 to about 0.2 inches, for example, about 0.125 inches. The first polyurethane layer has a hardness of from about 20 to about 70 durometers, typically from about 25 to about 60 durometers, more typically from about 30 to about 50 durometers, as measured using the ASTM D2240 type A scale.

The pet bed 10 also has a second polyurethane layer 22 bonded to the sides 18 of the core. For a rectangular bed, the second layer is bonded to the left, right, front and back sides of the core. The second layer has a thickness of from about 0.05 to about 0.3 inches, typically from about 0.1 to about 0.25 inches, for example, about 0.125 inches or about 0.25 inches. The second polyurethane layer has a hardness of from about 50 to about 100 durometers, typically from about 60 to about 80 durometers, for example about 70 durometers, as measured using the ASTM D2240 type A scale.

Figure 2:
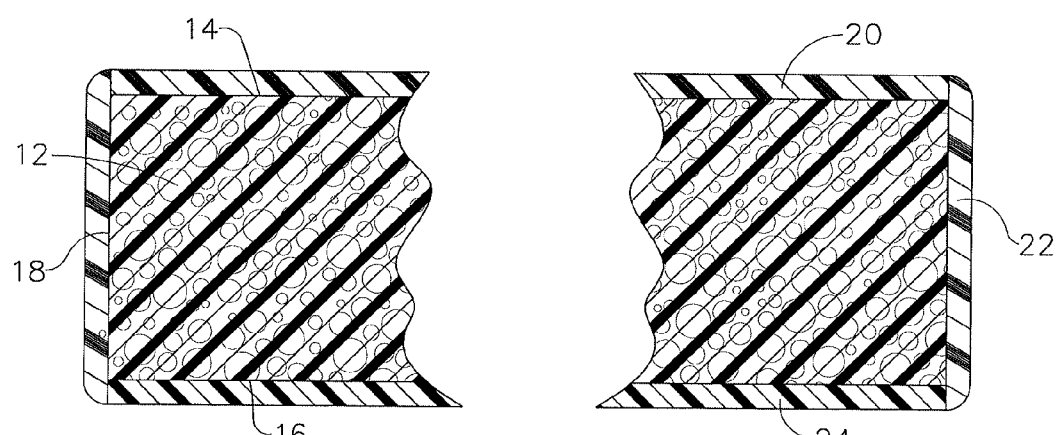
FIG. 2 is sectional view of the pet bed of FIG. 1.

The pet bed also typically has a third polyurethane layer bonded to the bottom of the polyurethane core. For example, pet bed 10 has a third polyurethane layer 24 bonded to the bottom surface 16 of the core. The third layer has a thickness of from about 0.05 to about 0.25 inches, typically from about 0.1 to about 0.2 inches, for example, about 0.125 inches. The third polyurethane layer has a hardness of from about 20 to about 70 durometers, typically from about 25 to about 60 durometers, more typically from about 30 to about 50 durometers, as measured using the ASTM D2240 type A scale. The first, second and third polyurethane layers typically completely encase the polyurethane core. As seen in FIG. 2, the transition from the first polyurethane layer 20 to the second polyurethane layer 22, and from the second layer 22 to the third polyurethane layer 24, is preferably a smooth transition with rounded corners so that the pet does not have a border to bite or grip and tear the layers from the core of the bed. Moreover, the polyurethane layers are firmly bonded to the polyurethane foam core so that the pet bed is an integral structure. Making the bed flat with relatively hard, exterior polyurethane layers makes it difficult for a dog to get a good grip on the bed to rip its teeth into the material. The sides of the bed typically have a harder polyurethane layer on them because the dog could bite at the edges. This provides a flat, durable bed having a relatively hard polyurethane shell that a dog cannot easily rip apart or separate from the polyurethane foam core. The comfortable polyurethane core provides good support for the dog's muscles and joints while the harder exterior polyurethane layers provide the durability necessary to prevent the dog from destroying the bed.

The pet bed 10 may be formed as an integral structure in a mold. The mold may be made of any suitable material, for example, wood, fiberglass and metal molds may be used, with or without a lining material. A smooth surface of the mold is preferred to provide smooth, liquid-impermeable exterior layers on the finished bed. The polyurethane layers formed on the bed should be impermeable to liquids, watertight and easily washable. Comfortable, supportive beds of the present invention can thus be made waterproof, easy to clean, and durable so they withstand abuse from an animal.

In one example, a first liquid polyurethane having a hardness of about 30 durometers is mixed with a desired color and poured about 0.125 inches deep into a wooden frame mold slightly larger in size than the desired finished pet bed. A piece of polyurethane foam about 1.5 inches thick is placed inside the mold on top of the liquid polyurethane. The mold is covered with a piece of wood to press the polyurethane foam against the liquid polyurethane. The liquid polyurethane is cured and bonds into the foam, providing a strong bond between the materials. After the first liquid polyurethane sets up (thickens), a second liquid polyurethane having a hardness of about 70 durometers is mixed, colored, and poured around the edges of mold. The mold is allowed to sit in an oven at a temperature of about 150-250 degrees F. for about 0.5-6 hours to set up. The resulting pet bed of the invention is about 20.25 inches long and about 14.25 inches wide. It has a 30 durometer first polyurethane layer about 0.125 inches thick bonded to the top surface of the polyurethane foam core, and a 70 durometer second polyurethane layer about 0.125 inches thick bonded to and surrounding the sides of the foam core. The pet bed can be bolted or otherwise secured down, for example using a hook and loop fastening system, to the floor or bottom of a dog's kennel. The bed is durable and provides good support and comfort for a dog. Optionally, a third polyurethane layer may be bonded to the bottom surface of the polyurethane foam core, such that the first, second and third layers completely encase the core. The third polyurethane layer may have a hardness of about 30 durometers and a thickness of about 0.125 inches.

In another example of the invention, the above second liquid polyurethane is poured into a mold and cured to form the side layers of the pet bed as one continuous separate piece. The side piece is put into a mold slightly larger in size than the finished bed along with the polyurethane foam, leaving a gap of about 0.0625-0.125 inches between the foam and the pre-molded sides. The above first liquid polyurethane is poured on top of the foam and fills the gap between the foam and the pre-molded sides about halfway down the sides. A block in the bottom of the gap around the sides prevents the liquid polyurethane from flowing to the bottom of the gap. The first liquid polyurethane hardens and bonds to the top of the foam and the upper half of the sides of the foam, along with the pre-molded side piece surrounding the foam. The bed is turned over and liquid polyurethane is poured or injected in the same manner as above to cover the foam and fill the remaining void area between the pre-molded sides and the foam. The resulting pet bed of the invention has a 30 durometer first polyurethane layer about 0.125 inches thick bonded to the top surface of the polyurethane foam core, a 70 durometer second polyurethane layer about 0.25 inches thick bonded to the sides of the foam core, through the 0.0625-0.125 inch thick layer of 30 durometer polyurethane bonded directly to the sides of the core, and a 50 durometer third polyurethane layer about 0.125 inches thick bonded to the bottom surface of the foam core, such that the first, second and third layers completely encase the core.

The color, thickness, hardness and number of polyurethane layers, and the type and thickness of polyurethane foam core, can be varied while maintaining the durability and comfort of the above pet bed.

Although the invention has been described in various details and embodiments, it is not intended to be limited to the details described and shown. Modifications and structural changes may be made without departing from the invention and the scope and range of the appended claims.

What is claimed is:

1. A durable pet bed comprising a flat polyurethane foam core having a top surface, a bottom surface and generally vertical sides, a first hard polyurethane layer bonded to the top surface of the core, said first layer having a thickness of from about 0.1 to about 0.25 inches and a hardness of from about 30 to about 70 durometers as measured using the ASTM D2240 type A scale, and a second hard polyurethane layer bonded to the sides of the core, said second layer having a thickness of from about 0.1 to about 0.3 inches and a hardness of from about 70 to about 100 durometers as measured using the ASTM D2240 type A scale, wherein the polyurethane layers contact and are firmly bonded to the polyurethane foam core so the pet bed is an integral structure and the polyurethane layers are harder than the polyurethane foam core.

2. The pet bed of claim 1 wherein the first layer has a thickness of from about 0.1 to about 0.2 inches and a hardness of front about 30 to about 50 durometers.

3. The pet bed of claim 1 wherein the second layer has a thickness of from about 0.1 to about 0.25 inches and a hardness of from about 70 to about 80 durometers.

4. The pet bed of claim 3 wherein the first layer has a thickness of from about 0.1 to about 0.2 inches and a hardness of from about 30 to about 50 durometers.

5. The pet bed of claim 1 further comprising a third hard polyurethane layer bonded to the bottom surface of the core, said third layer having a thickness of from about 0.05 to about 0.25 inches and having a hardness of from about 20 to about 100 durometers as measured using the ASTM D2240 type A scale, wherein said first, second and third layers completely encase the core.

6. The pet bed of claim 5 wherein the first layer has a thickness of from about 0.1 to about 0.2 inches and a hardness of from about 30 to about 50 durometers.

7. The pet bed of claim 6 wherein the second layer has a thickness of from about 0.1 to about 025 inches and a hardness of from about 70 to about 80 durometers.

8. The pet bed of claim 7 wherein the third layer has a thickness of from about 0.1 to about 0.2 inches and a hardness of from about 30 to about 50 durometers.

9. The pet bed of claim 5 wherein the first, layer has a hardness of from about 30 to about 50 durometers, the second layer has a hardness of from about 70 to about 80 durometers, and the third layer has a hardness of from about 30 to about 50 durometers.

10. The pet bed of claim 9 wherein each of the first, second and third layers has a thickness of from about 0.1 to about 0.2 inches.

\* \* \* \* \*

UNITED STATES PATENT AND TRADEMARK OFFICE
CERTIFICATE OF CORRECTION

PATENT NO.        : 9,648,846 B2
APPLICATION NO.   : 13/836990
DATED             : May 16, 2017
INVENTOR(S)       : Joseph Thomas Landers It is certified that error appears in the above-identified patent and that said Letters Patent is hereby corrected as shown below:

In the Claims

Claim 2, Line 54, delete "front". Insert --from--.

Claim 7, Line 5, delete "025". Insert --0.25--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*